US009759113B2

(12) United States Patent
Thomas et al.

(10) Patent No.: US 9,759,113 B2
(45) Date of Patent: *Sep. 12, 2017

(54) COAXIAL FLOW INJECTOR

(71) Applicant: Tenneco Automotive Operating Company Inc., Lake Forest, IL (US)

(72) Inventors: Stephen M. Thomas, Laingsburg, MI (US); John Lowry, Brooklyn, MI (US); Eric Grant, Ypsilanti, MI (US); Roshan Rodrigues, Dexter, MI (US); David Hammer, Tecumseh, MI (US); Christopher Otto, Belleville, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 225 days.

This patent is subject to a terminal disclaimer.

(21) Appl. No.: 14/564,450

(22) Filed: Dec. 9, 2014

(65) Prior Publication Data
US 2015/0090808 A1  Apr. 2, 2015

Related U.S. Application Data

(63) Continuation of application No. 13/468,614, filed on May 10, 2012, now Pat. No. 8,910,884.

(51) Int. Cl.
*F01N 1/00* (2006.01)
*F01N 3/36* (2006.01)
(Continued)

(52) U.S. Cl.
CPC ............ *F01N 3/36* (2013.01); *F01N 3/2066* (2013.01); *F01N 3/28* (2013.01); *F01N 2610/02* (2013.01);
(Continued)

(58) Field of Classification Search
CPC ... B05B 1/3426; B05B 1/3093; B05B 1/3484; B05B 1/3053; F23D 11/383
(Continued)

(56) References Cited

U.S. PATENT DOCUMENTS 702,770 A   6/1902 Barrington
2,235,834 A   3/1941 Gillette et al.
(Continued)

FOREIGN PATENT DOCUMENTS

CN   101378838 A   3/2009
DE   2418227 A1   10/1975
(Continued)

*Primary Examiner* — Arthur O Hall
*Assistant Examiner* — Viet Le
(74) *Attorney, Agent, or Firm* — Harness, Dickey & Pierce, P.L.C.

(57) ABSTRACT

An injector for injecting a reagent includes an axially translatable valve member positioned within a housing. An electromagnet is positioned within the housing and includes a coil of wire positioned proximate the valve member such that the valve member moves between a seated position and an unseated position relative to an orifice in response to energizing the electromagnet. A connector coupled to the housing includes an inlet tube concentrically aligned with and surrounding a return tube. The inlet tube is adapted to receive pressurized reagent from a source of reagent. The return tube is adapted to return reagent to the source.

21 Claims, 7 Drawing Sheets

(51) Int. Cl.
*F01N 3/28* (2006.01)
*F01N 3/20* (2006.01)

(52) U.S. Cl.
CPC .............. *F01N 2610/1453* (2013.01); *F01N 2610/1473* (2013.01); *Y02T 10/24* (2013.01)

(58) Field of Classification Search
USPC .................. 239/421, 73, 585.1–585.5, 125
See application file for complete search history.

(56) References Cited

U.S. PATENT DOCUMENTS

| | | | |
|---|---|---|---|
| 2,637,344 A | 3/1941 | Gillette et al. | |
| 3,927,984 A | 12/1975 | Hartley | |
| 3,958,757 A | 5/1976 | Happel et al. | |
| 4,179,069 A | 12/1979 | Knapp et al. | |
| 4,215,820 A | 8/1980 | Renger | |
| 4,292,947 A | 10/1981 | Tanasawa et al. | |
| 4,499,878 A | 2/1985 | Igashira et al. | |
| 4,610,080 A | 9/1986 | Hensley | |
| 4,717,080 A | 1/1988 | Sauer | |
| 4,726,523 A | 2/1988 | Kokubo et al. | |
| 4,742,964 A | 5/1988 | Ito et al. | |
| 4,805,837 A | 2/1989 | Brooks et al. | |
| 4,869,429 A | 9/1989 | Brooks et al. | |
| 4,887,769 A | 12/1989 | Okamoto et al. | |
| 4,938,455 A | 7/1990 | Grohmann | |
| 4,982,902 A * | 1/1991 | Knapp ................ F02M 51/065 138/113 | |
| 5,046,472 A | 9/1991 | Linder | |
| 5,060,868 A | 10/1991 | Knapp et al. | |
| 5,114,116 A | 5/1992 | Muller et al. | |
| 5,307,997 A | 5/1994 | Wakeman | |
| 5,325,838 A | 7/1994 | Bennett | |
| 5,522,218 A | 6/1996 | Lane et al. | |
| 5,570,841 A | 11/1996 | Pace et al. | |
| 5,571,248 A | 11/1996 | Seetharaman et al. | |
| 5,605,042 A | 2/1997 | Stutzenberger | |
| 5,687,698 A | 11/1997 | Mastro et al. | |
| 5,713,327 A | 2/1998 | Tilton et al. | |
| 5,857,478 A | 1/1999 | Davison et al. | |
| 5,884,611 A | 3/1999 | Tarr et al. | |
| 5,924,280 A | 7/1999 | Tarabulski | |
| 5,943,858 A | 8/1999 | Hofmann et al. | |
| 5,950,932 A | 9/1999 | Takeda et al. | |
| 5,970,953 A | 10/1999 | Lorraine et al. | |
| 5,976,475 A | 11/1999 | Peter-Hoblyn et al. | |
| 5,979,866 A | 11/1999 | Baxter et al. | |
| 6,041,594 A | 3/2000 | Brenner et al. | |
| 6,063,350 A | 5/2000 | Tarabulski et al. | |
| 6,164,322 A | 12/2000 | Najmolhoda et al. | |
| 6,168,098 B1 | 1/2001 | Brinn, Jr. | |
| 6,192,677 B1 | 2/2001 | Tost et al. | |
| 6,206,343 B1 | 3/2001 | Kato et al. | |
| 6,257,496 B1 | 7/2001 | Wyant | |
| 6,273,120 B1 | 8/2001 | Hofmann et al. | |
| 6,279,603 B1 | 8/2001 | Czarnik et al. | |
| 6,293,097 B1 | 9/2001 | Wu et al. | |
| 6,382,533 B1 | 5/2002 | Mueller et al. | |
| 6,409,102 B1 | 6/2002 | Luttrell et al. | |
| 6,454,192 B2 | 9/2002 | Perry | |
| 6,470,676 B2 | 10/2002 | Dolling et al. | |
| 6,494,388 B1 | 12/2002 | Mueller et al. | |
| 6,526,746 B1 | 3/2003 | Wu | |
| 6,539,708 B1 | 4/2003 | Hofmann et al. | |
| 6,708,904 B2 | 3/2004 | Itatsu | |
| 6,739,525 B2 | 5/2004 | Dantes et al. | |
| 6,742,330 B2 | 6/2004 | Genderen | |
| 6,845,760 B2 | 1/2005 | Linna et al. | |
| 6,877,680 B2 | 4/2005 | Bauer et al. | |
| 6,913,004 B2 | 7/2005 | Pellizzari et al. | |
| 6,913,005 B2 | 7/2005 | Linna et al. | |
| 6,922,987 B2 | 8/2005 | Mital et al. | |
| 6,988,681 B2 | 1/2006 | Reiter | |
| 7,021,558 B2 | 4/2006 | Chenanda et al. | |
| 7,032,576 B2 | 4/2006 | Linna et al. | |
| 7,059,307 B2 | 6/2006 | Pellizzari et al. | |
| 7,100,366 B2 | 9/2006 | Hager et al. | |
| 7,137,383 B2 | 11/2006 | Linna et al. | |
| 7,225,998 B2 | 6/2007 | Pellizzari | |
| 7,237,731 B2 | 7/2007 | Dallmeyer et al. | |
| 7,296,781 B2 | 11/2007 | Akabane | |
| 7,299,997 B2 | 11/2007 | Sayar | |
| 7,306,172 B2 | 12/2007 | Sayar | |
| 7,311,273 B2 | 12/2007 | Agneray et al. | |
| 7,337,768 B2 | 3/2008 | Elia et al. | |
| 7,344,090 B2 | 3/2008 | Sayar | |
| 7,467,749 B2 | 12/2008 | Tarabulski et al. | |
| 7,481,205 B2 | 1/2009 | Keeler et al. | |
| 7,503,543 B2 | 3/2009 | Nomichi et al. | |
| 7,703,709 B2 | 4/2010 | Akabane et al. | |
| 7,770,823 B2 | 8/2010 | Kubota et al. | |
| 7,861,520 B2 | 1/2011 | Broderick et al. | |
| 8,024,922 B2 | 9/2011 | van Vuuren et al. | |
| 8,038,080 B2 | 10/2011 | Malek et al. | |
| 8,047,452 B2 | 11/2011 | Martin et al. | |
| 8,740,113 B2 | 6/2014 | Roessle et al. | |
| 8,910,884 B2 * | 12/2014 | Thomas .................. F01N 3/28 239/124 | |
| 8,973,895 B2 | 3/2015 | Thomas et al. | |
| 8,998,114 B2 | 4/2015 | Olivier et al. | |
| 2002/0001554 A1 | 1/2002 | Czarnik et al. | |
| 2003/0178011 A1 | 9/2003 | Pellizzari et al. | |
| 2003/0222158 A1 | 12/2003 | Boehland et al. | |
| 2004/0041112 A1 | 3/2004 | Goossens et al. | |
| 2004/0187483 A1 | 9/2004 | Dalla Betta et al. | |
| 2005/0028793 A1 | 2/2005 | Pellizzari et al. | |
| 2005/0098588 A1 | 5/2005 | Dunne | |
| 2006/0108443 A1 | 5/2006 | Huffman et al. | |
| 2007/0048204 A1 | 3/2007 | Mital | |
| 2007/0221748 A1 | 9/2007 | Hornby et al. | |
| 2008/0022663 A1 | 1/2008 | Dodge et al. | |
| 2008/0180200 A1 | 7/2008 | Gamble | |
| 2009/0064972 A1 | 3/2009 | Abe et al. | |
| 2009/0179087 A1 | 7/2009 | Martin et al. | |
| 2009/0301067 A1 | 12/2009 | Dingle et al. | |
| 2010/0192913 A1 | 8/2010 | Keidel et al. | |
| 2011/0025439 A1 | 2/2011 | Rettinger et al. | |
| 2011/0192140 A1 | 8/2011 | Olivier et al. | |

FOREIGN PATENT DOCUMENTS

| | | |
|---|---|---|
| DE | 2460111 A1 | 7/1976 |
| DE | 10241697 A1 | 4/2003 |
| EP | 1111231 A2 | 6/2001 |
| EP | 1291498 A2 | 3/2003 |
| EP | 2336544 A1 | 6/2011 |
| EP | 1081487 B1 | 1/2012 |
| GB | 702770 A | 1/1954 |
| JP | 57-204457 | 12/1982 |
| JP | 60-040777 | 3/1985 |
| JP | 05-141330 B2 | 6/1993 |
| JP | H09504591 A | 5/1997 |
| JP | H11166410 A | 6/1999 |
| JP | 2001-342928 A | 12/2001 |
| JP | 2002-525491 A | 8/2002 |
| JP | 2003-083041 | 3/2003 |
| JP | 2003-083053 A | 3/2003 |
| JP | 2003-328735 A | 11/2003 |
| JP | 2004-176586 A | 6/2004 |
| JP | 2005-201158 A | 7/2005 |
| JP | 2006-226162 A | 8/2006 |
| JP | 2007225117 A | 9/2007 |
| JP | 2008-101564 A | 5/2008 |
| JP | 2009-539026 A | 11/2009 |
| JP | 2010247106 A | 11/2010 |
| WO | WO-9606270 A1 | 2/1996 |
| WO | WO-98/28070 A1 | 7/1998 |
| WO | WO-00/18491 A1 | 4/2000 |
| WO | WO-2004029446 A1 | 4/2004 |
| WO | WO-2005108753 A1 | 11/2005 |
| WO | WO-2010059294 A1 | 5/2010 |

\* cited by examiner

COAXIAL FLOW INJECTOR

CROSS-REFERENCE TO RELATED APPLICATIONS

This application is a continuation of U.S. patent application Ser. No. 13/468,614 filed on May 10, 2012. The entire disclosure of the above application is incorporated herein by reference.

FIELD

The present disclosure relates to injector systems and, more particularly, relates to an injector system for injecting a reagent, such as an aqueous urea solution, into an exhaust stream to reduce oxides of nitrogen ($NO_x$) emissions from diesel engine exhaust.

BACKGROUND

This section provides background information related to the present disclosure which is not necessarily prior art. Lean burn engines provide improved fuel efficiency by operating with an excess of oxygen, that is, a quantity of oxygen that is greater than the amount necessary for complete combustion of the available fuel. Such engines are said to run "lean" or on a "lean mixture." However, this improved or increase in fuel economy, as opposed to non-lean burn combustion, is offset by undesired pollution emissions, specifically in the form of oxides of nitrogen ($NO_x$).

One method used to reduce $NO_x$ emissions from lean burn internal combustion engines is known as selective catalytic reduction (SCR). SCR, when used, for example, to reduce $NO_x$ emissions from a diesel engine, involves injecting an atomized reagent into the exhaust stream of the engine in relation to one or more selected engine operational parameters, such as exhaust gas temperature, engine rpm or engine load as measured by engine fuel flow, turbo boost pressure or exhaust $NO_x$ mass flow. The reagent/exhaust gas mixture is passed through a reactor containing a catalyst, such as, for example, activated carbon, or metals, such as platinum, vanadium or tungsten, which are capable of reducing the $NO_x$ concentration in the presence of the reagent.

An aqueous urea solution is known to be an effective reagent in SCR systems for diesel engines. However, use of such an aqueous urea solution involves many disadvantages. Urea is highly corrosive and may adversely affect mechanical components of the SCR system, such as the injectors used to inject the urea mixture into the exhaust gas stream. Urea also may solidify upon prolonged exposure to high temperatures, such as temperatures encountered in diesel exhaust systems. Solidified urea will accumulate in the narrow passageways and exit orifice openings typically found in injectors. Solidified urea may also cause fouling of moving parts of the injector and clog any openings or urea flow passageways, thereby rendering the injector unusable.

Some reagent injection systems are configured to include a pump, a supply line and a return line such that aqueous urea is continuously pumped to minimize solidification and also transfer heat from the injector to the aqueous urea stored at a remote location. Typically, an injector is equipped with an inlet coupled to the supply line and a spaced apart outlet coupled to the return line. While injectors configured in this manner have functioned sufficiently in the past, packaging and cost concerns may arise regarding the provision and applying of more than one reagent flow line. Other considerations include ease of installation, reagent flow uniformity and a possible benefit regarding moving the reagent inlet further away from the heat source. Accordingly, it may be desirable to provide an improved injector system including a reagent injector having coaxial supply and return lines.

SUMMARY

This section provides a general summary of the disclosure, and is not a comprehensive disclosure of its full scope or all of its features.

An injector for injecting a reagent includes an axially translatable valve member positioned within a housing. An electromagnet is positioned within the housing and includes a coil of wire positioned proximate the valve member such that the valve member moves between a seated position and an unseated position relative to an orifice in response to energizing the electromagnet. A connector coupled to the housing includes an inlet tube concentrically aligned with and surrounding a return tube. The inlet tube is adapted to receive pressurized reagent from a source of reagent. The return tube is adapted to return reagent to the source.

An injector for injecting a reagent includes including an axially translatable valve member positioned within a housing. An electromagnet is positioned within the housing such that the valve member moves between a seated position and an unseated position relative to an orifice in response to energizing the electromagnet. A connector is coupled to the housing and includes an inlet tube concentrically aligned with a return tube. The inlet tube is adapted to receive pressurized reagent from a source of reagent. The return tube is adapted to return reagent to the source. An inner body is positioned within the housing to at least partially define a flow path for reagent to pass between the inner body and the housing. The inner body includes a bypass passage and a plurality of swirl slots. Reagent flows from the inlet tube, through the flow path and the bypass passage to the return tube when the valve member is in the seated position. A portion of the reagent flows from the inlet tube, through the flow path, through the swirl slots and out of the orifice when the valve member is in the unseated position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

It should be understood that although the present teachings may be described in connection with diesel engines and the reduction of $NO_x$ emissions, the present teachings may be used in connection with any one of a number of exhaust streams, such as, by way of non-limiting example, those from diesel, gasoline, turbine, fuel cell, jet or any other power source outputting a discharge stream. Moreover, the present teachings may be used in connection with the reduction of any one of a number of undesired emissions. For example, injection of hydrocarbons for the regeneration of diesel particulate filters is also within the scope of the present disclosure. For additional description, attention should be directed to commonly-assigned U.S. Patent Application Publication No. 2009/0179087A1, filed Nov. 21, 2008, entitled "Method And Apparatus For Injecting Atomized Fluids", which is incorporated herein by reference.

Figure 1:
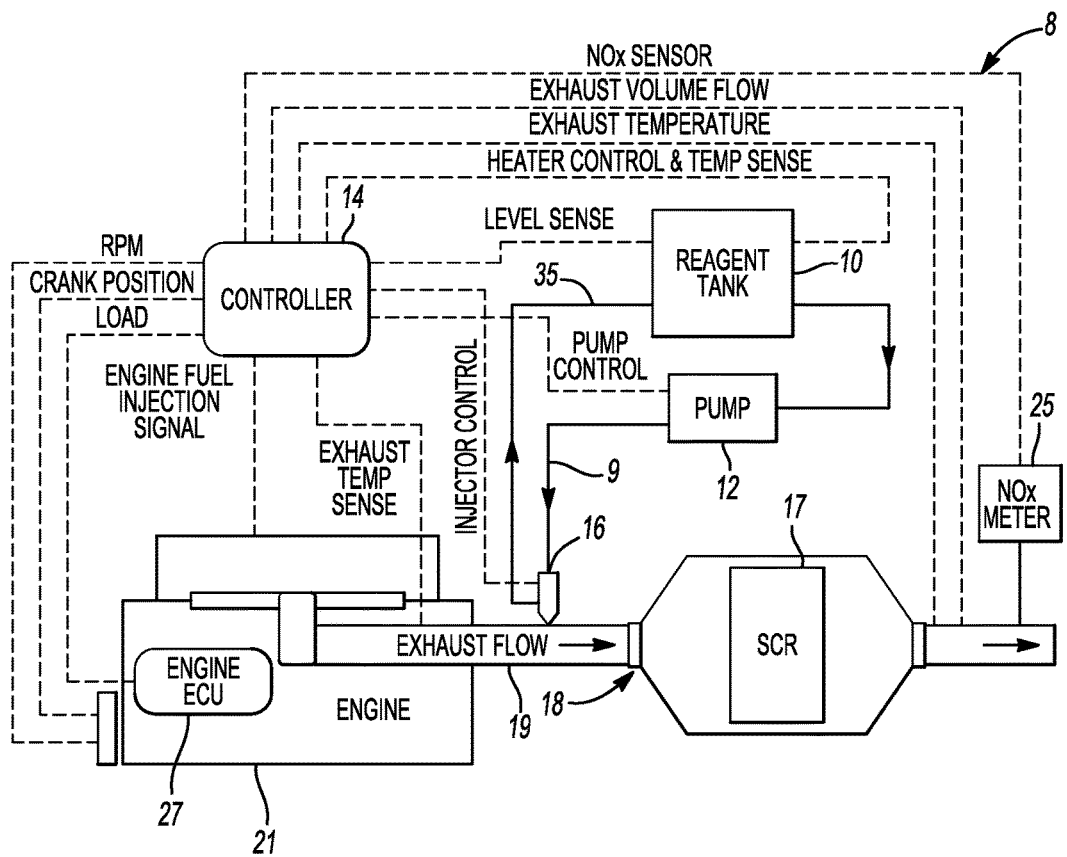
FIG. 1 is a schematic depicting an exemplary exhaust aftertreatment system including an electromagnetically controlled reagent injector constructed in accordance with the teachings of the present disclosure.
Figure 2:
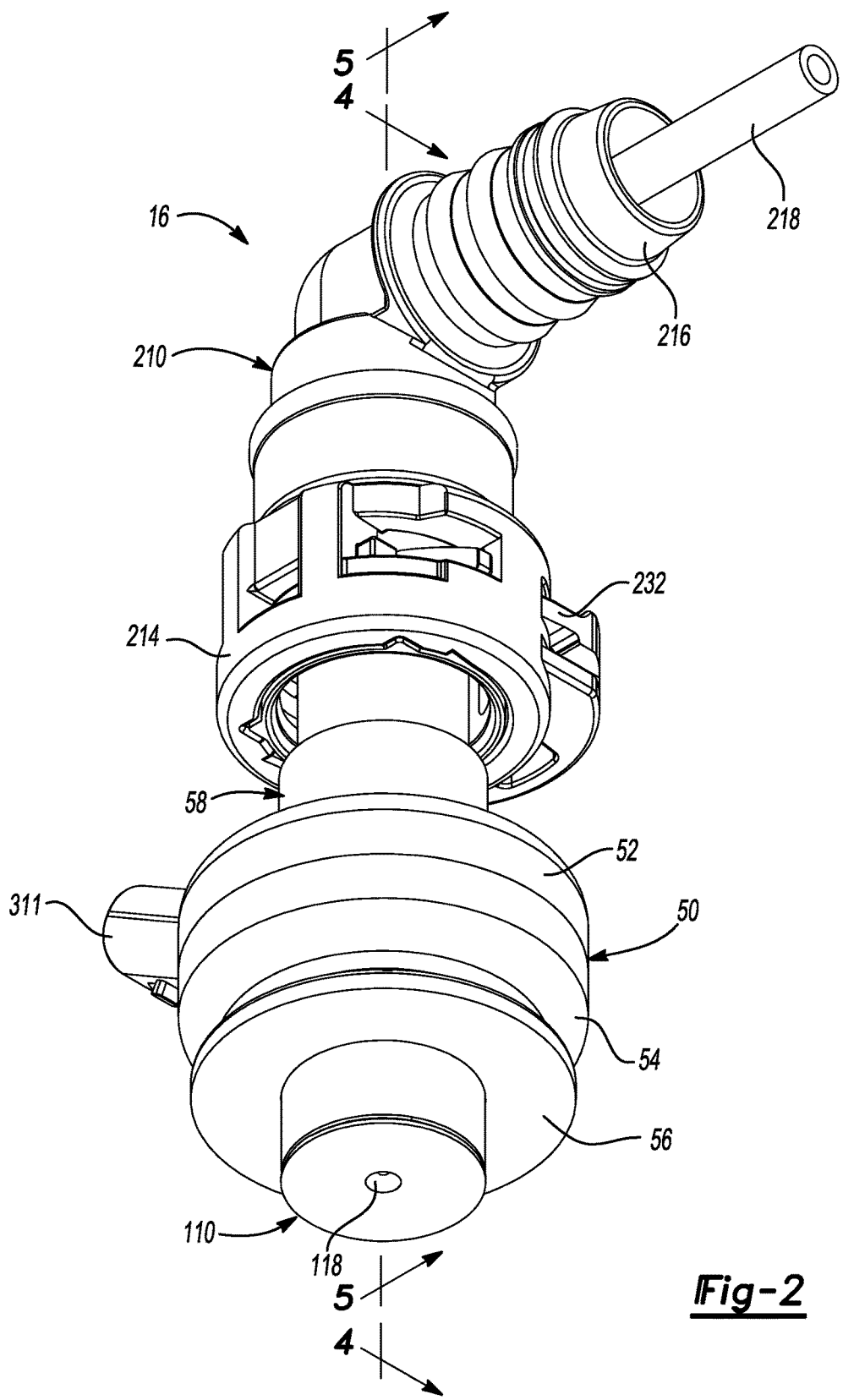
FIG. 2 is a perspective view of the electromagnetically controlled reagent injector.
Figure 3:
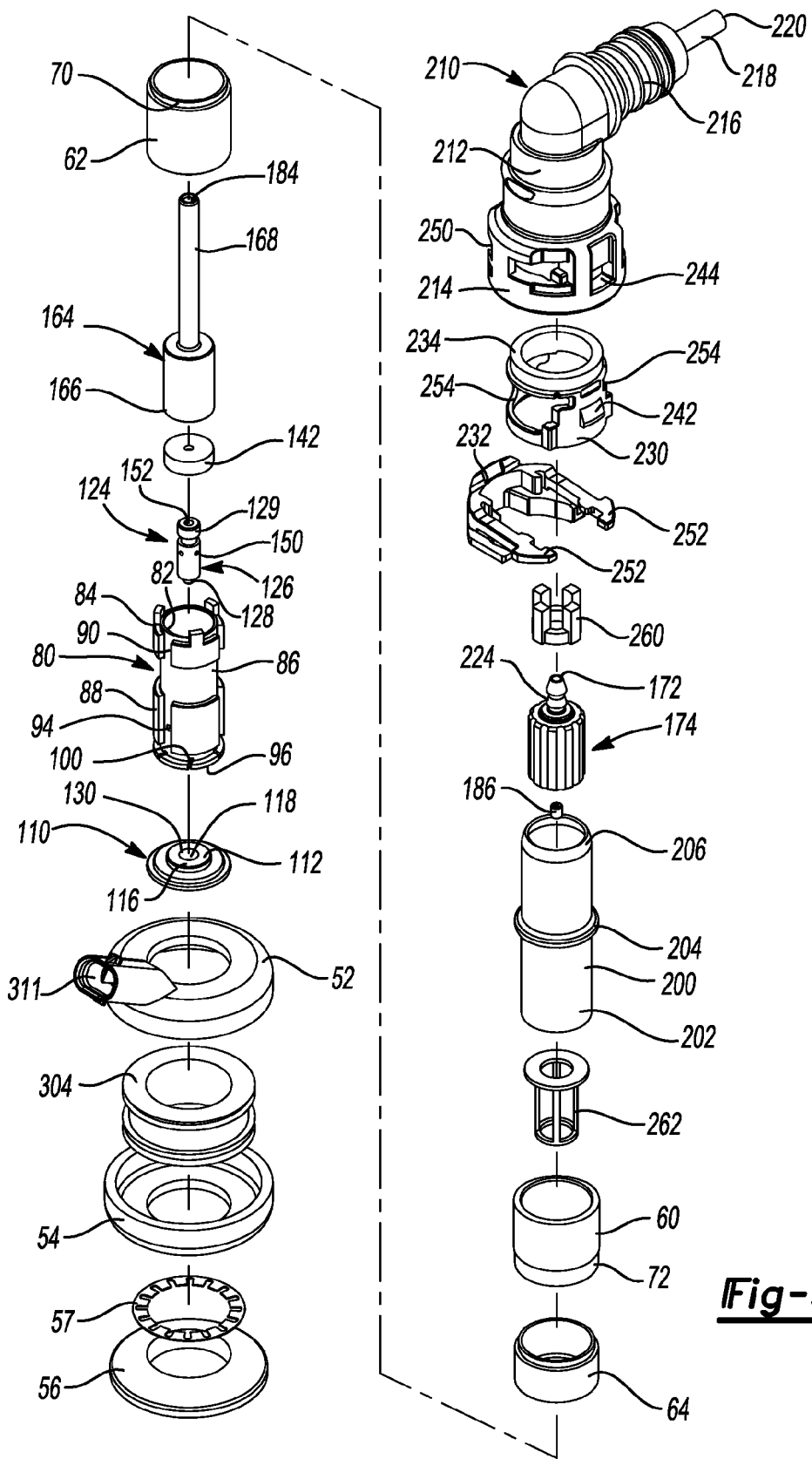
FIG. 3 is an exploded perspective view of the reagent injector.
Figure 4:
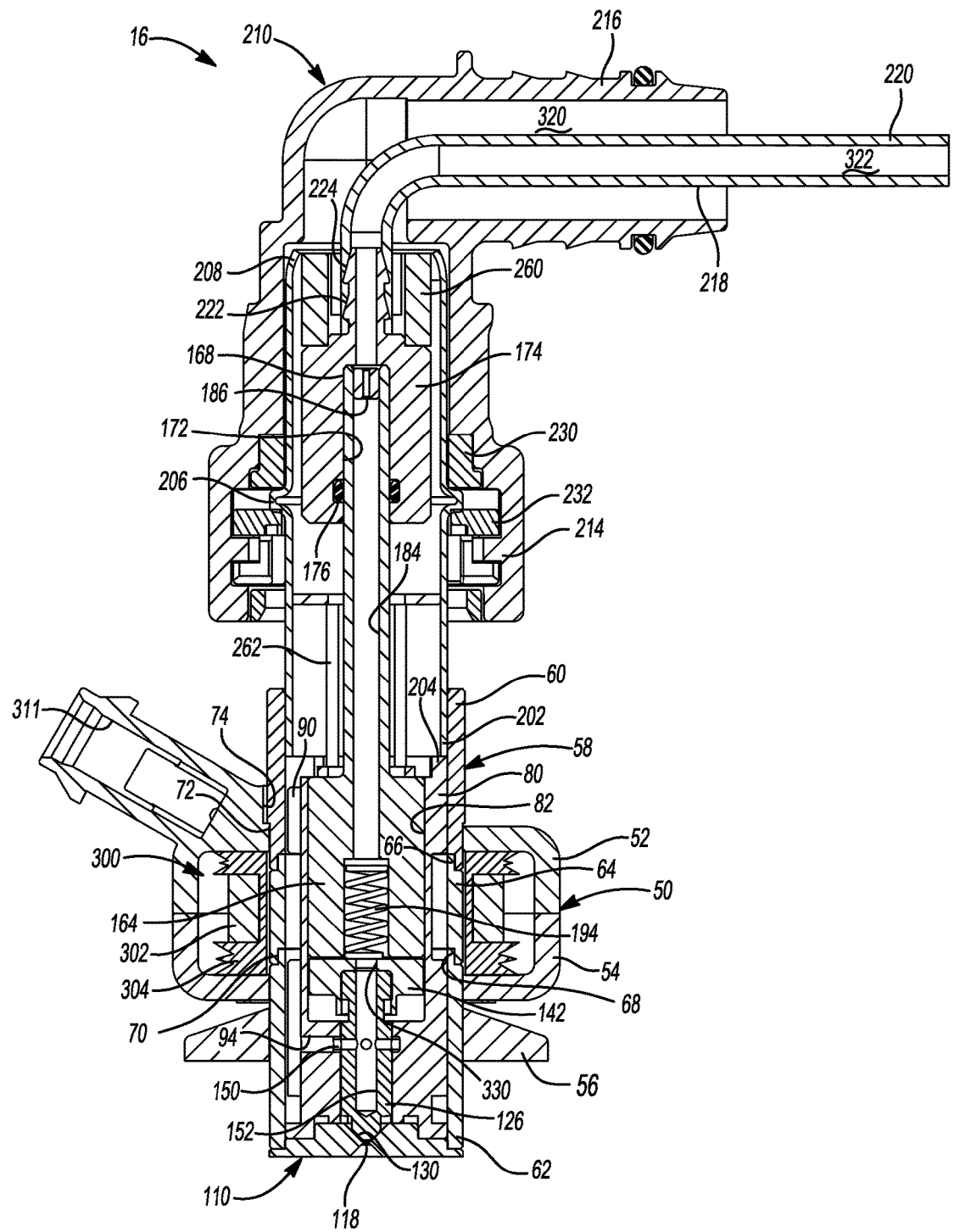
FIG. 4 is a cross-sectional view taken through the injector depicted in FIGS. 2 and 3.
Figure 5:
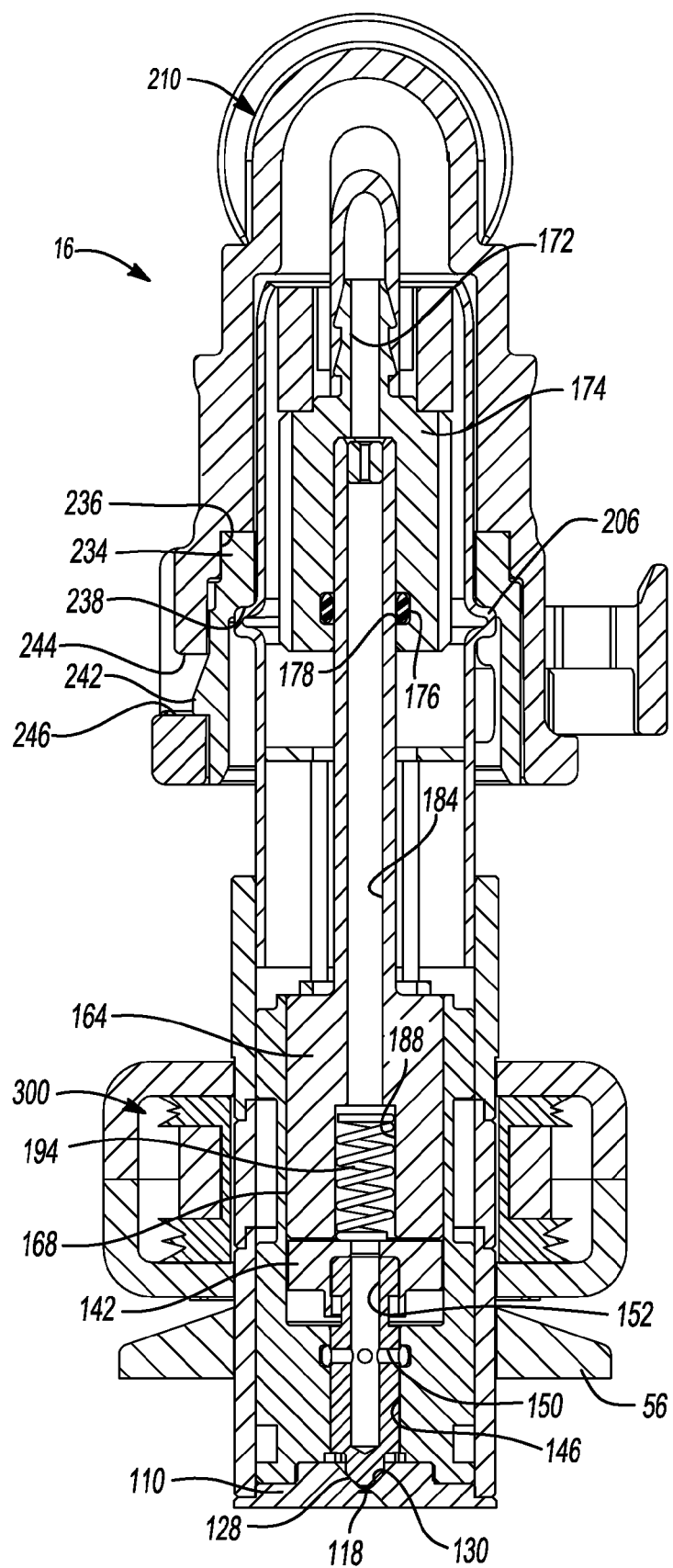
FIG. 5 is another cross-sectional view taken through the injector depicted in FIGS. 2 and 3.
Figure 6:
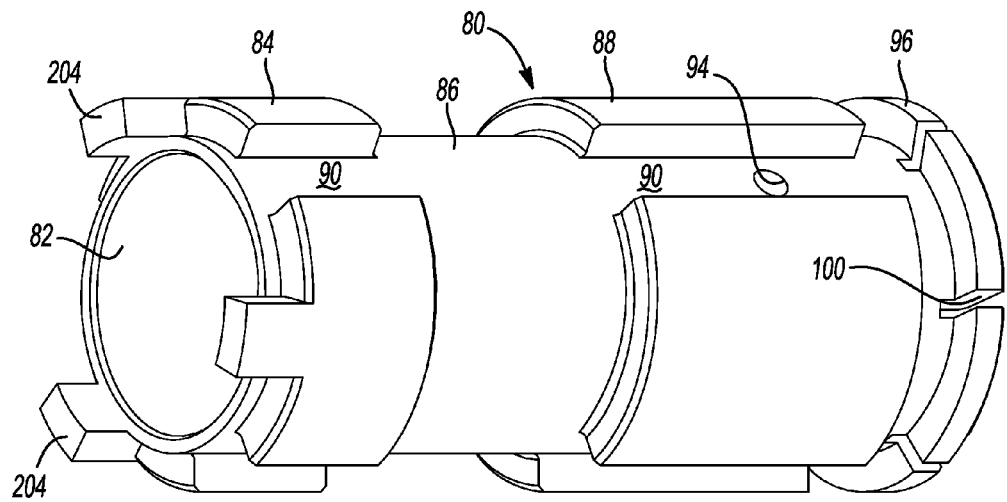
FIG. 6 is a perspective view of an inner lower body of the previously depicted injector.
Figure 7:
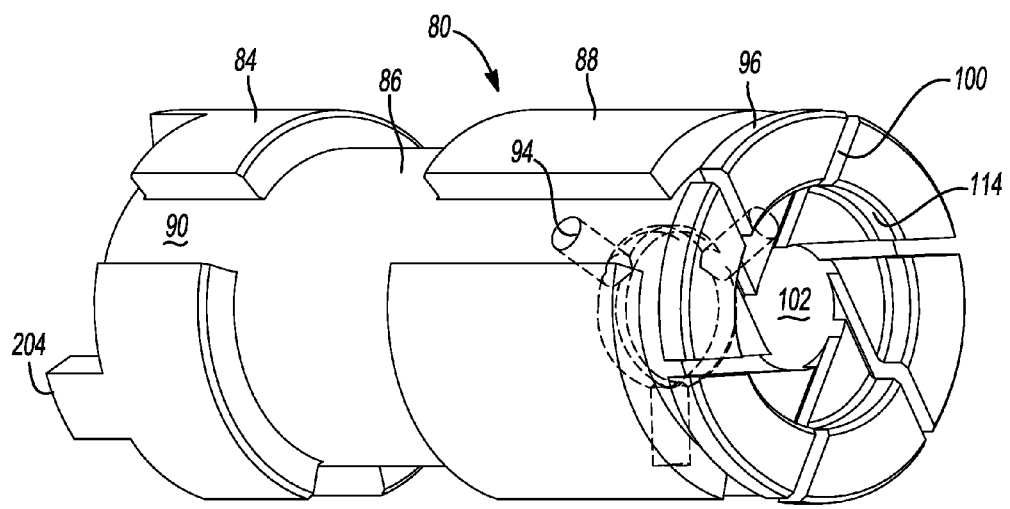
FIG. 7 is another perspective view of the inner lower body of the previously depicted injector.

With reference to the Figures, a pollution control system 8 for reducing $NO_x$ emissions from the exhaust of an internal combustion engine 21 is provided. In FIG. 1, solid lines between the elements of the system denote fluid lines for reagent and dashed lines denote electrical connections. The system of the present teachings may include a reagent tank 10 for holding the reagent and a delivery module 12 for delivering the reagent from the tank 10. The reagent may be a urea solution, a hydrocarbon, an alkyl ester, alcohol, an organic compound, water, or the like and can be a blend or combination thereof. It should also be appreciated that one or more reagents may be available in the system and may be used singly or in combination. The tank 10 and delivery module 12 may form an integrated reagent tank/delivery module. Also provided as part of system 8 is an electronic injection controller 14, a reagent injector 16, and an exhaust system 18. Exhaust system 18 includes an exhaust conduit 19 providing an exhaust stream to at least one catalyst bed 17.

The delivery module 12 may comprise a pump that supplies reagent from the tank 10 via a supply line 9. The reagent tank 10 may be polypropylene, epoxy coated carbon steel, PVC, or stainless steel and sized according to the application (e.g., vehicle size, intended use of the vehicle, and the like). A pressure regulator (not shown) may be provided to maintain the system at predetermined pressure setpoint (e.g., relatively low pressures of approximately 60-80 psi, or in some embodiments a pressure of approximately 60-150 psi) and may be located in the return line 35 from the reagent injector 16. A pressure sensor may be provided in the supply line 9 leading to the reagent injector 16. The system may also incorporate various freeze protection strategies to thaw frozen reagent or to prevent the reagent from freezing. During system operation, regardless of whether or not the injector is releasing reagent into the exhaust gases, reagent may be circulated continuously between the tank 10 and the reagent injector 16 to cool the injector and minimize the dwell time of the reagent in the injector so that the reagent remains cool. Continuous reagent circulation may be necessary for temperature-sensitive reagents, such as aqueous urea, which tend to solidify upon exposure to elevated temperatures of 300° C. to 650° C. as would be experienced in an engine exhaust system.

Furthermore, it may be desirable to keep the reagent mixture below 140° C. and preferably in a lower operating range between 5° C. and 95° C. to ensure that solidification of the reagent is prevented. Solidified reagent, if allowed to form, may foul the moving parts and openings of the injector.

The amount of reagent required may vary with load, exhaust gas temperature, exhaust gas flow, engine fuel injection timing, desired $NO_x$ reduction, barometric pressure, relative humidity, EGR rate and engine coolant temperature. A $NO_x$ sensor or meter 25 is positioned downstream from catalyst bed 17. $NO_x$ sensor 25 is operable to output a signal indicative of the exhaust $NO_x$ content to an engine control unit 27. All or some of the engine operating parameters may be supplied from engine control unit 27 via the engine/vehicle databus to the reagent electronic injection controller 14. The reagent electronic injection controller 14 could also be included as part of the engine control unit 27. Exhaust gas temperature, exhaust gas flow and exhaust back pressure and other vehicle operating parameters may be measured by respective sensors.

With reference to FIGS. 2-7, reagent injector 16 will be further described. Reagent injector 16 includes an outer body assembly 50 having an outer body upper section 52 and an outer body lower section 54. Outer body lower section 54 may be fixed to outer body upper section 52 via welding or a mechanical fastening process. A mounting flange 56 may be fixed to outer body assembly 50 to couple injector 16 to conduit 19. A washer 57 is positioned between mounting flange 56 and outer body assembly 50.

A fluid sleeve assembly 58 is depicted as a three-piece assembly having a first flux bridge collar 60 and a second flux bridge collar 62 interconnected by a flux break 64. Fluid sleeve assembly 58 is shaped as an elongated hollow cylindrical member sized and positioned to extend through outer body assembly 50. First flux bridge collar 60 includes a counterbore 66 sized to receive a reduced outer diameter stepped portion of flux break 64. Flux break 64 includes a counterbore 68 sized to cooperate with a reduced outer diameter portion 70 of second flux bridge collar 62. First flux bridge collar 60 includes a reduced outer diameter portion 72 cooperating with a pocket 74 formed in outer body upper section 52.

An elongated inner lower body 80 may be received within fluid sleeve assembly 58. Elongated inner lower body 80 includes an elongated throughbore 82. A plurality of circumferentially spaced apart upper protrusions 84 radially outwardly extend from a cylindrical portion 86. A plurality of circumferentially spaced apart lower protrusions 88 radially outwardly extend from cylindrical portion 86. The gaps between each of upper protrusions 84 and each of lower protrusions 88 are aligned with one another to define several axially extending flow channels or flow paths 90. A plurality of circumferentially spaced apart apertures 94 radially extend through elongated inner lower body 80 interconnecting flow channels 90 and bore 82. A flange 96 radially outwardly extends from cylindrical portion 86 at one end of elongated inner lower body 80. A plurality of swirl slots 100 extend through flange 96 terminating at an inner volume or swirl chamber 102. Swirl slots 100 are positioned to tangentially intersect swirl chamber 102. Swirl slots 100 are in fluid communication with flow paths 90.

An orifice plate 110 is fixed to fluid sleeve assembly 58 and engages inner lower body 80. Orifice plate 110 includes a raised center hub portion 112 received within a recess 114 formed in inner lower body 80. A surface 116 of center hub portion 112 defines a portion of swirl chamber 102. An orifice 118 extends through orifice plate 110 and is in fluid communication with swirl chamber 102.

A valve member 124 is slidably positioned within bore 82. Valve member 124 includes an elongated pintle 126 having a conically shaped first end 128 and an opposite second end 129. First end 128 is selectively engageable with a valve seat 130 of orifice plate 110 to define a sealed and closed position of valve member 124 when seated. An unsealed, open position exists when pintle 126 is spaced apart from valve seat 130. Valve seat 130 surrounds orifice 118. The valve seat may be conically or cone-shaped as shown to complement the conical end 128 of pintle 126 to restrict the flow of reagent through orifice 118. Depending on the application and operating environment, pintle 126 and orifice plate 110 may be made from a carbide material, which may provide desired performance characteristics and may be more easily and cost-effectively manufactured. In addition, limitations or disadvantages associated with other materials may be avoided, such as those associated with manufacturing complex part shapes. Carbide may provide additional advantages, such as insensitivity to brazing temperatures that may range from 870-980° C., as opposed to carbon steels and tool steels, which may distemper. Carbide may also provide an increased surface hardness when compared to the hardness achievable with most other steels. Carbide may also be advantageous with regard to overall wear resistance.

A pintle head 142 is fixed to second end 129 of pintle 126. Pintle head 142 is slidably positioned within bore 82. A running-class slip fit between pintle head 142 and bore 82 provides an upper guide for valve member 124. A lower valve member guide is formed at the sliding interface between pintle 126 and a reduced diameter portion 146 of bore 82. Based on this arrangement, valve member 124 is accurately aligned with valve seat 130 and orifice 118.

A plurality of circumferentially spaced apart and radially extending apertures 150 extend through pintle 126. A longitudinally extending blind bore 152 extends from second end 129 into fluid communication with apertures 150. When pintle 126 is in the closed or seated position, apertures 150 are positioned in fluid communication with apertures 94 to define a portion of a reagent return passageway.

A pole piece 164 includes an enlarged diameter first end 166 sized to be received within bore 82. First end 166 of pole piece 164 is fixed to inner lower body 80 using a process such as electron beam welding or laser welding. A reduced diameter opposite second end 168 of pole piece 164 is sealingly fitted within a bore 172 formed in a coupling 174. A seal 176 is positioned within a groove 178 of coupling 174. Elongated pole piece 164 includes a central bore 184 extending therethrough. Central bore 184 is coaxially aligned with bore 152 and bore 172. An orifice 186 is positioned within central bore 184 at second end 168 of pole piece 164. A counterbore 188 inwardly extends from second end 168 of pole piece 164. A compression spring 194 is positioned within counterbore 188 in biased engagement with pintle head 142 to urge valve member 124 into engagement with seat 130.

A tube 200 includes a first end 202 positioned within first flux bridge collar 60 and fixed thereto. First end 202 abuts circumferentially spaced apart stops 204 axially extending from inner lower body 80. Tube 200 also includes a radially outwardly flared portion 206 and a second end 208.

A coaxial connector 210 includes a housing 212 having an enlarged collar 214 at one end and an integrally formed inlet tube 216 at an opposite end. A return tube 218 extends through inlet tube 216 making a ninety degree turn within housing 212. A first end 220 of return tube 218 extends beyond a terminal end of inlet tube 216. A second opposite end 222 of return tube 218 engages a barbed external surface 224 of coupling 174.

A retainer 230 and a clip 232 cooperate with collar 214 to removably secure housing 212 to tube 200. More particularly, a cylindrical pilot 234 of retainer 230 is received within a stepped bore 236 of housing 212. Portion 206 of tube 200 engages a land 238 of retainer 230. Clip 232 retains portion 206 against land 238. A tang 242 radially outwardly protrudes from retainer 230 and engages collar 214 in a snap fit engagement by protruding through an aperture 244 and engaging a surface 246. Clip 232 is transversely inserted through an aperture 250 extending through collar 214. Legs 252 extend through apertures 254 extending through retainer 230 to restrict relative motion between housing 212, retainer 230 and clip 232. A spacer 260 is positioned within housing 212 to provide a path for reagent flowing through inlet tube 216. A cage 262 is positioned within tube 200 to retain an inlet filter (not shown) therein.

An electromagnet assembly 300 is positioned within outer body assembly 50 as depicted in the Figures. Electromagnet assembly 300 includes a coil of wire 302 wrapped around a bobbin 304. Pintle head 142 is constructed from a magnetic material such as 430 stainless steel such that electrical energization of coil 302 produces a magnetic field urging pintle head 142 toward pole piece 164. When coil 302 is energized, first end 128 of pintle 126 becomes disengaged from seat 130 to allow reagent to flow through orifice 118. Power may be provided to coil 302 via access to a receptacle 311, for example, in response to a signal from electronic injection controller 14.

Flux bridge collars 60 and 62 are constructed from ferritic 430 stainless steel. Pole piece 164 is made from ferritic 430 stainless steel or a similar magnetic material. Pintle head 142 may be made from ferritic 430 stainless steel. Flux break 64 is made from non-ferritic and non-magnetic 304 stainless steel as is inner lower body 80. Constructing the previously described components from magnetic and non-magnetic materials as well as closely positioning the magnetic materials adjacent to one another greatly improves the magnetic circuit performance associated with electromagnet assembly 300. Benefits may include the use of a smaller coil wire, a lesser number of turns of wire, and a reduced quantity of electric current to provide an improved electromagnetic actuator having lower cost, reduced size and mass. Increased control regarding the position of valve member 124 is also realized.

A closed loop reagent fluid path is provided when pintle 126 of reagent injector 16 is in the closed position. Reagent is provided from reagent tank 10 via delivery module 12 to inlet tube 216 via an inlet passageway 320 of dual passageway connector 210 interconnecting delivery module 12 and injector 16. It is contemplated that inlet passageway 320 coaxially extends within inlet tube 216 and along an outer surface of return tube 218. A return passageway 322 is provided inside of return tube 218. Reagent being supplied to reagent injector 16 travels through inlet passageway 320 formed between inlet tube 216 and return tube 218. Reagent continues to flow past spacer 260. A passageway is formed between tube 200 and coupling 174 to allow reagent to pass thereby. Reagent continues to flow downward as viewed in the Figures toward orifice 118 through filter cage 262.

Pressurized reagent continues to flow through flow paths 90 along an inner surface of fluid sleeve assembly 58 and around inner lower body 80. Supplied reagent flows substantially to the bottom of fluid sleeve assembly 58 and passes through swirl slots 100 to enter swirl chamber 102. When pintle 126 is seated, reagent does not flow through orifice 118. Reagent flows through apertures 94 of inner lower body 80 and apertures 150 of pintle 126 to enter longitudinal bore 152. Pintle head 142 includes an aperture 330 placing longitudinal bore 152 in fluid communication with central bore 184 of the return fluid passageway. Reagent flowing along the return path passes through orifice 186 and bore 172 of coupling 174. As previously noted, return tube 218 is fixed to coupling 174. When reagent is not being injected into the exhaust system, the reagent is continuously pumped to flow past coil 302 and through pintle 126 to transfer heat from orifice plate 110 and pintle 126 to the flowing reagent.

When electromagnet 300 is energized, pintle 126 is moved from seat 130. Pressurized reagent positioned in communication with swirl slots 100 flows through each of the swirl slots to enter swirl chamber 102. Based on the pressure differential between orifice 118 and swirl slots 100 as well as the tangential relationship of swirl slots 100 to swirl chamber 102, a swirling reagent motion is induced. The low pressure at orifice 118 combined with pressurized reagent moving in a swirling or circular fashion creates a finely atomized spray exiting orifice 118. Reagent that does not exit orifice 118 continues to be recirculated as previously described.

Figure 8:
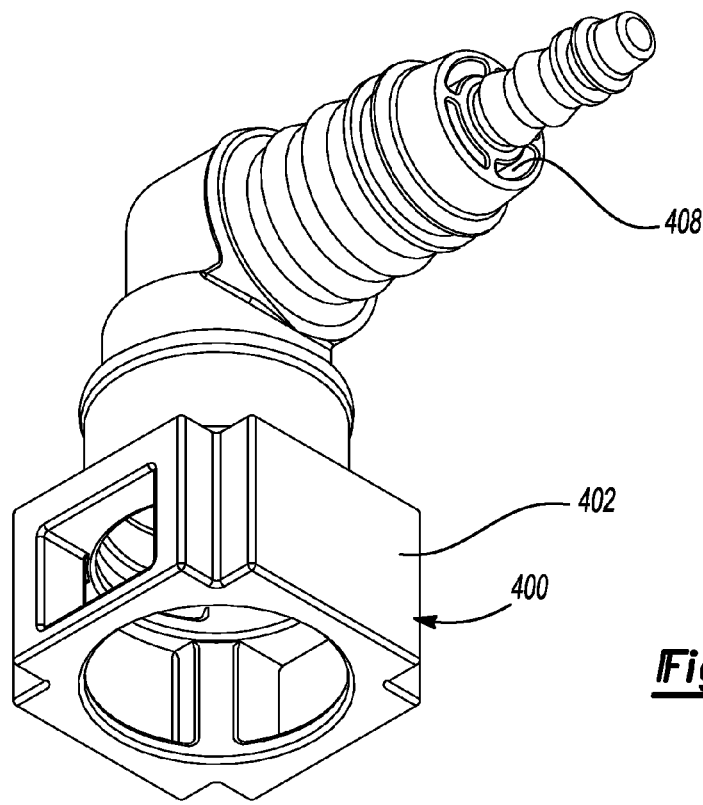
FIG. 8 is a perspective view of an alternate connector.
Figure 9:
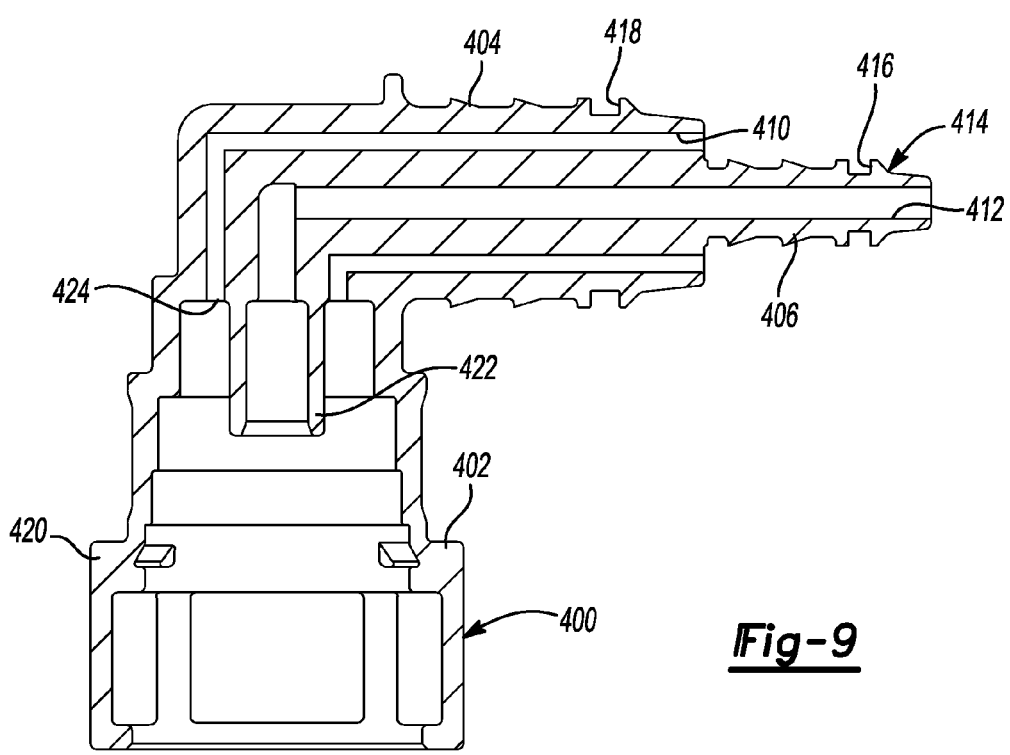
FIG. 9 is a cross-sectional view taken through the alternate connector of FIG. 8.

FIGS. 8 and 9 depict an alternate coaxial connector identified at reference numeral 400. Coaxial connector 400 includes a monolithic, one-piece, housing 402. Housing 402 includes an inlet tube portion 404 and a return tube portion 406. A plurality of radially extending webs 408 support return tube portion 406 within inlet tube portion 404. An inlet passageway 410 extends between an inner surface of inlet tube portion 404 and an outer surface of return tube portion 406. A return passageway 412 extends from a nipple 414 of return tube portion 406. A seal groove 416 is formed on an outer surface of return tube portion 406. In similar fashion, a seal groove 418 is provided on an outer surface of inlet tube portion 404. Both inlet tube portion 404 and return tube portion 406 are barbed to provide a secure hose connection.

A collar portion 420 of coaxial connector 400 is sized and shaped to receive an end of tube 200 or a similar portion of injector 16. Return tube portion 406 makes a 90 degree turn and terminates at an open end 422. A fluid connection such as previously described between second end 222 of coupling 174 and return tube 218 is provided with coaxial connector 400 as well. An exit port 424 is positioned at the end of inlet passageway 410 to provide pressurized reagent to orifice 118 as previously described. It should be appreciated that the remaining components of injector 16 may be used in combination with alternate coaxial connector 400 without departing from the scope of the present disclosure.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. An injector for injecting a liquid, comprising:
a tubular housing;
an axially translatable valve member positioned within the housing;
an electromagnet surrounding the housing, the electromagnet positioned such that the valve member moves between a seated position and an unseated position relative to an orifice in response to energizing the electromagnet; and
a one-piece monolithic inner body positioned within the housing and including a channel, wherein a supply passageway axially extends through the channel between the inner body and the tubular housing, the inner body including a bypass passage and a plurality of swirl slots, wherein liquid flows through the supply passageway, through the swirl slots and out of the orifice when the valve member is in the unseated position, the inner body including a central bore defining a return passageway in fluid communication with the bypass passage, the fluid flowing through the bypass passage and the return passageway when the valve member is in the seated position.

2. The injector of claim 1, wherein the supply passageway and the return passageway extend substantially coaxially to one another and wherein the liquid therein flows in opposite directions.

3. The injector of claim 1, wherein the supply passageway and the return passageway are at least partially contained within the tubular housing.

4. The injector of claim 3, further including a pole piece including a central bore defining a portion of the return passageway, the pole piece being fixed to the inner body.

5. The injector of claim 4, wherein the valve member is captured within a pocket formed within the inner body, the pole piece restricting the axial extent of movement of the valve member.

6. The injector of claim 5, further including a fitting including a bore in receipt of the pole piece.

7. The injector of claim 1, wherein the inner body includes a plurality of circumferentially spaced apart protrusions that cooperate with the tubular housing to at least partially define the supply passageway.

8. The injector of claim 7, wherein the plurality of circumferentially spaced apart protrusions at least partially define the channel and other channels, the channels being a portion of the supply passageway.

9. The injector of claim 8, wherein the inner body includes a plurality of angled swirl slots to direct the liquid to a swirl chamber positioned proximate the orifice.

10. The injector of claim 9, wherein the swirl slots are in communication with the channels.

11. The injector of claim 8, wherein the inner body includes a radially extending flange axially spaced apart from the protrusions and positioned at a distal end of the inner body to define a circumferential channel, the bypass passage radially extending between the spaced apart protrusions outside of the circumferential channel to interconnect the supply passageway with the return passageway.

12. The injector of claim 1, wherein a first end of the inner body includes axially extending and circumferentially spaced apart stops and wherein the housing includes an upper tube including an end engaging the stops, gaps between the stops defining a portion of the supply passageway.

13. The injector of claim 12, wherein the housing includes a lower tube overlapping and fixed to a portion of the upper tube, the lower tube being capped with an orifice plate through which the orifice extends.

14. The injector of claim 1, wherein the tubular housing extends through a coil of the electromagnet.

15. The injector of claim 1, wherein the inner body includes a radially extending passage interconnecting the supply passageway and the return passageway to at least partially define the bypass passage.

16. An injector for injecting a liquid, comprising:
a tubular housing;
a fitting positioned within the housing and including a return passageway extending therethrough;
an electromagnet including a coil of wire, the coil of wire surrounding the tubular housing;
an axially translatable valve positioned within the housing and being moveable between seated and unseated positions in response to energizing the electromagnet; and
a connector coupled to and disconnectable from both the tubular housing and the fitting, the connector including coaxially extending inlet and return tubes, each tube having first and second ends, the first end of the inlet tube adapted to receive pressurized fluid from a source, the first end of the return tube adapted to be coupled to the source, the second end of the inlet tube being removably connected to the tubular housing to provide pressurized fluid to a supply passageway extending through the housing, the second end of the return tube being removably connected to the fitting to receive fluid from the return passageway.

17. The injector of claim 16, wherein the connector is a one-piece monolithic plastic component.

18. The injector of claim 17, wherein the inlet tube and the return tube concentrically extend along a right angle bend.

19. An injector for injecting a liquid, comprising:
a housing;
an axially translatable pintle positioned within the housing, wherein the pintle includes an elongated first portion having a first diameter and a conically-shaped first end, the pintle including an enlarged head portion at its opposite second end;
an electromagnet positioned proximate the pintle head portion, wherein the pintle moves between a seated position and an unseated position relative to an orifice in response to energizing the electromagnet; and
a one-piece monolithic pintle guide including a stepped bore in receipt of the pintle, the enlarged head portion of the pintle being guided within a first portion of the stepped bore while the elongated first portion of the pintle is slidably guided within a second portion of the stepped bore, a pintle guide including external open channels circumferentially spaced apart from another and interconnected by a circumferentially extending channel, the channels cooperating with an inner surface of the housing to at least partially define a supply passageway extending between an outer surface of the pintle guide and an inner surface of the housing, the supply passageway terminating at a radially extending flange of the pintle guide, the radially extending flange including a plurality of angled slots extending therethrough placing the supply passageway in fluid communication with a swirl chamber circumscribed by the flange, the swirl chamber being in communication with the orifice.

20. The injector of claim 19, further including a pole piece received within the first portion of the stepped bore, the pole piece including a through bore defining a portion of a liquid return passageway.

21. The injector of claim 20, wherein the pintle guide and the pintle include radially extending apertures defining a portion of the return passageway.

\* \* \* \* \*